United States Patent [19]

Beckwith

[11] 4,350,144
[45] Sep. 21, 1982

[54] HOT WATER HEATING SYSTEM

[75] Inventor: John R. Beckwith, Cupertino, Calif.

[73] Assignee: Stanford Associates, Inc., Menlo Park, Calif.

[21] Appl. No.: 179,066

[22] Filed: Aug. 18, 1980

[51] Int. Cl.³ .............................................. F24J 3/02
[52] U.S. Cl. ................................... 126/427; 236/1 E
[58] Field of Search ............... 126/427, 420, 421, 430, 126/436, 437, 435, 417, 452; 236/1 EA, 1 ER

[56] References Cited

U.S. PATENT DOCUMENTS

| | | | |
|---|---|---|---|
| 2,300,560 | 11/1942 | Faber | 236/1 E |
| 3,242,978 | 3/1966 | McGann | 236/1 ER |
| 3,586,869 | 6/1971 | Kompelien | 236/1 ER |
| 3,799,145 | 3/1974 | Butterfield | 126/427 |
| 3,935,855 | 2/1976 | Van Vliet | 236/1 ER |
| 4,034,912 | 7/1977 | Hayes | 126/427 |
| 4,141,408 | 2/1979 | Garnett | 236/1 ER |
| 4,143,814 | 3/1979 | Hill | 126/427 |
| 4,159,017 | 6/1979 | Novi | 126/427 |
| 4,191,172 | 4/1980 | Walch et al. | 126/427 |
| 4,232,657 | 11/1980 | Killorin | 126/427 |

*Primary Examiner*—Daniel J. O'Connor
*Attorney, Agent, or Firm*—Jack M. Wiseman; Francis W. Anderson

[57] ABSTRACT

A system for heating domestic hot water includes solar collectors for raising the temperature of the water in the usual hot water storage tank. When a tap is opened, the water is drawn out of the tank and directed through a mixing valve which checks the temperature of the water and, if necessary, adjusts the temperature to an intermediate temperature somewhat below the temperature at which the water is to be used. The water then passes through a heater in which the temperature of the water is quickly raised to the elevated temperature at which it is normally used in households.

3 Claims, 4 Drawing Figures

HOT WATER HEATING SYSTEM

BACKGROUND OF THE INVENTION

1. Field of the Invention

This invention relates to hot water heating systems, and more particularly concerns water heating systems in households where hot water is used intermittently and at times is not used at all for relatively long periods.

2. Description of the Prior Art

In domestic hot water systems now in use, water with a temperature in the range of about 34°–70° F. is drawn from a source such as a city main, and stored in a tank that acts as both a heater and a storage unit. A control unit, which is under the direction of thermostats, causes the feeding of fuel to a burner that is associated with the heater to bring the temperature of the water in the tank up to a desired temperature in the range of 140°–180° F. Once the desired temperature has been obtained, the thermostats will cycle on and off to activate or de-activate the burner to maintain the water in the desired temperature range.

An obvious disadvantage of this arrangement is that a considerable amount of fuel must be used to initially raise the temperature of the incoming water. Also, since heat is lost through the insulated wall of the tank, the burner must be repeatedly activated to maintain the temperature within the selected range even when no water is drawn out of the tank by a member of the household.

A solar system has been proposed for lessening or eliminating the fuel expenditure incurred in initially warming up the relatively cold water from the city mains. Such a solar system involves the steps of directing the relatively cold water from the city main into a first storage tank, withdrawing the water, circulating it through solar heating panels and redirecting it into the tank, thus providing a tank of preheated water at a minimum temperature of about 100° F. The tempered water is then withdrawn from the storage tank and directed into a second tank where a conventional control and burner maintain the water at the desired temperature, for example, 160° F. While this system results in a savings in fuel in the initial heating of the relatively cold water, it also has the disadvantage that, during long periods of non-use, fuel is wasted due to the necessity of the burner cycling on and off to maintain the water in the second storage tank at the desired temperature.

To solve the problem of heat-loss from large quantities of stored water, the practice of maintaining large reserves of fuel-heated water has been eliminated in some European and Latin American countries. These places use a quick-heat device that turns on a burner in a heat-exchanger while the water is being used. The burner is turned on by a water-flow transducer so that fuel is expended only when water is being drawn by the user. While this arrangement eliminates the fuel loss due to the constant cycling needed to keep a quantity of stored water at a desired temperature, it too is wasteful of fuel since the heat exchangers that are used require that the burner comes on at full output any time the unit is being used regardless of the amount of water being drawn. Further, if a small amount of water is being used, as when a person is washing his hands, the unit will not come on at all. Accordingly, in order to energize the unit and obtain hot water, the user must open the faucet wide so that the heater will turn on. This procedure is wasteful of water and fuel. Also, if two users want hot water at the same time, the water often flows through the heat-exchanger too fast for the water to be raised to the desired temperature. The use of a solar heat preheater would not eliminate the excessive use of fuel in such a quick-heat system, since the heat exchanger turns on at full power regardless of the temperature of the water coming into the heat exchanger.

SUMMARY OF THE INVENTION

This invention provides a system in which the large volume of water conventionally stored in a hot water tank is heated by the action of solar panels, thus eliminating the utilization of fuel to initially heat the relatively cold water received from the city mains, and the use of fuel to continually maintain at a desired level the water temperature which drops due to heat loss through the walls of the tank. When a person opens a tap to obtain water at a desired elevated temperature, a conduit directs the water from the storage tank through a mixing valve which senses the temperature of the water and adjusts it to the temperature at which it is to be used if the temperature is above that desired temperature. The water is then directed through a heat-exchanger which is effective to raise the temperature of the water to the desired level only if the temperature is below the desired temperature. Delivery of fuel to the burner of the heat-exchanger is regulated by a control unit which is responsive to the temperature of water leaving the mixing valve and to the physical movement of water toward the heat-exchanger. The control unit will not turn on the burner unless two conditions are present, namely, water is actually being used and the temperature of the water is below the desired use temperature.

Accordingly, it is an object of the present invention to provide a hot water heating system in which solar heating of water and heating by means of a fuel-burning heater are arranged to take advantage of the inherent ability of solar heating to provide more or less continuous input of heat to a quantity of stored water and the ability of a fuel-fired burner to quickly raise the temperature of water. Another object is to provide means for heating water which results in considerable savings of non-renewal fuel.

A further object is to provide an improved method of heating water, particularly water for domestic use.

DESCRIPTION OF A PREFERRED EMBODIMENT

Figure 1:
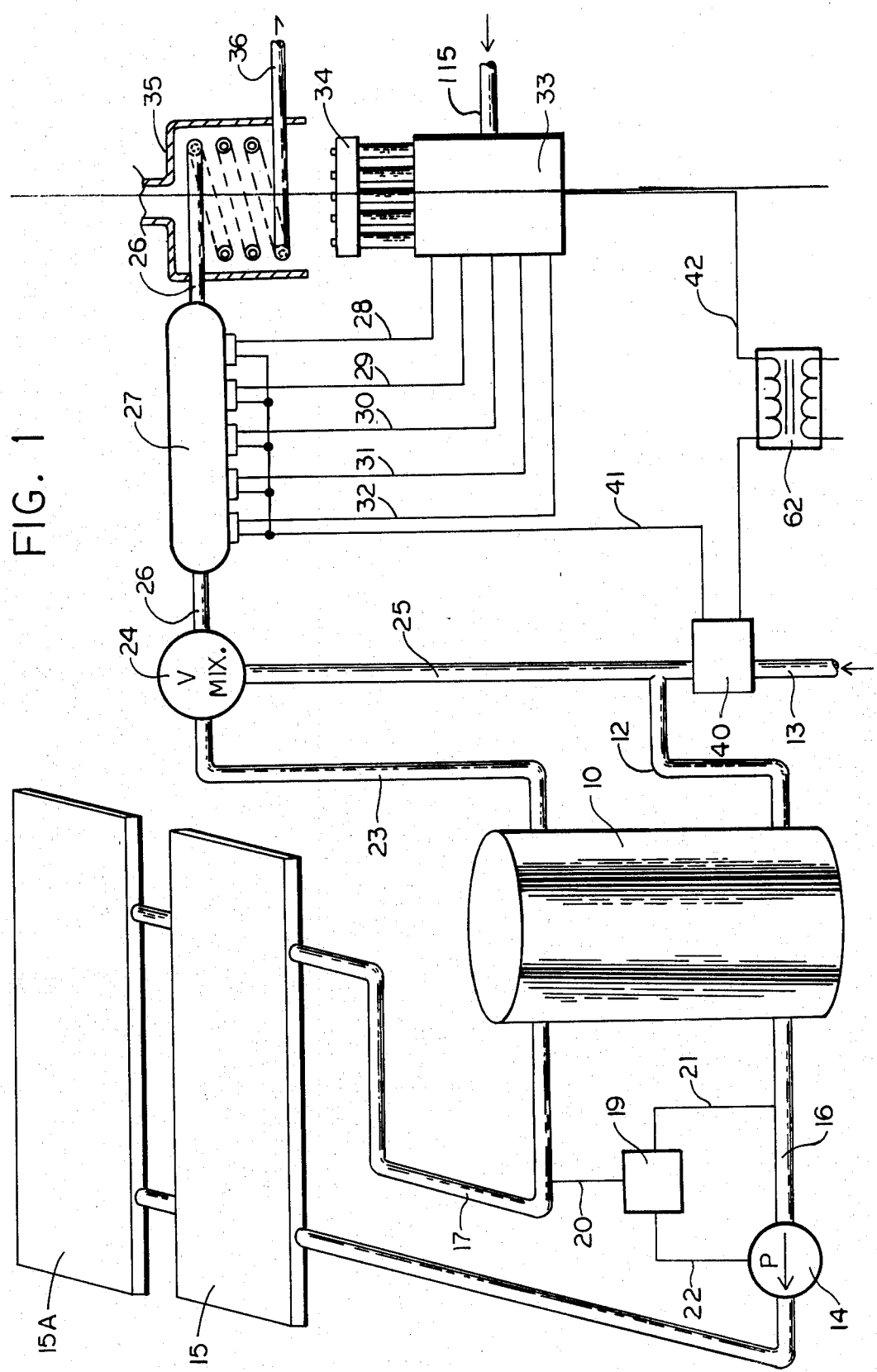
FIG. 1 is a diagrammatic showing of the hot water heating system of the present invention.

In FIG. 1, the reference numeral 10 indicates a 20 to 100 gallon tank into the lower end of which water at from about 34° F. to 70° F. is directed by conduits 12 and 13 leading from a source of water, such as a city main. A pump 14 draws water from the lower end of tank 10 through a conduit 16, pumps it through an array of solar collectors 15 and 15A, and delivers it through conduit 17 back to the upper end of the tank 10. For convenience in illustration, the collectors are shown one above the other with the conduit 17 extending from a lower portion of collector plate 15. It will be understood that in an actual installation the plates would be disposed in an arrangement, such as a side-by-side, in which the water can move upwardly as it is heated and be removed at the upper end of the plates. The solar collectors are of a type and size such that the water passing therethrough will be heated to a minimum temperature of about 100° F. and a maximum of about 200° F. A differential controller 19 is connected between the inlet conduit 16, the outlet conduit 17 and the pump 14.

The function of the controller 19 is to activate the pump 14 only when the temperature of the water leaving the solar panel is a predetermined amount higher than the temperature of the water leaving the tank 10.

Accordingly, the controller has one input sensor 20 connected to conduit 17 as close as possible to the collector 15 and another sensor 21 connected to conduit 16 as close as possible to the storage tank. The mechanism in the controller compares the temperatures in the two conduits and, acting in accordance with the difference in the temperatures, sends a signal through conductor 22 to the pump 14 to activate it when the temperature difference reaches a predetermined value. The controller includes means for selecting different differentials and the setting usually selected is a 20° differential.

Thus, with the controller set for a 20° temperature differential, the pump will be activated whenever the temperature of the water in conduit 17 is 20 degrees higher than that in conduit 16. The pump will continue to operate until the temperatures are equal or nearly equal and then it will automatically shut itself off. Therefore, water movement within the solar loop occurs only when it will raise the temperature of the water in the storage tank and never when it would lower that temperature.

The solar-heated water mixes with the water in the tank 10, and the mixed water is then drawn off at the relatively hot upper end of the stratified tank and directed through a conduit 23 to a mixing valve 24, which also receives water from a conduit 25 that communicates with the cold water inlet conduit 13. If the desired temperature of the water at the point of use is 140° F., the valve is set at 140° F. so that, if the water in conduit 23 is at a temperature higher than 140° F., the valve will allow the entry of a small amount of the cold water from conduit 25 until the water in the receiving conduit 26 from the valve 24 is 140° F.

If the temperature of the water in conduit 23 is less than 140° F., the valve will not permit any water from conduit 25 to be added but will pass whatever water it receives from conduit 23 to the conduit 26 which carries it through a temperature transducer 27. Thus, water reaches the temperature transducer 27 at a temperature of 140° F. or less. The temperature transducer, which will be explained hereinafter, has conductors 28-32 connected in the control circuit of a burner control unit 33 which controls the flow of gas to a burner 34. The burner 34 is operatively associated with a heat exchanger 35 which includes internal coils that receive water from the conduit 26 after it leaves the temperature transducer 27. A conduit 36 receives the heated water from the coils of the burner 34 and delivers the water to the point of use. As pointed out above, the present heating system is adapted to assure that water is delivered by conduit 36 at a predetermined temperature as for example, 140° F.

A flow transducer 40, which is connected in the inlet conduit 13, has electrical conductors 41 and 42 leading respectively to the temperature transducer 27 and to the burner control unit 33 through transformer 62 which provides necessary power to operate the system. The arrangement is such that, if no water flows through the flow transducer 40, the temperature transducer 27 will not be energized and the burner control unit will not be able to activate the burner 34.

Figure 2:
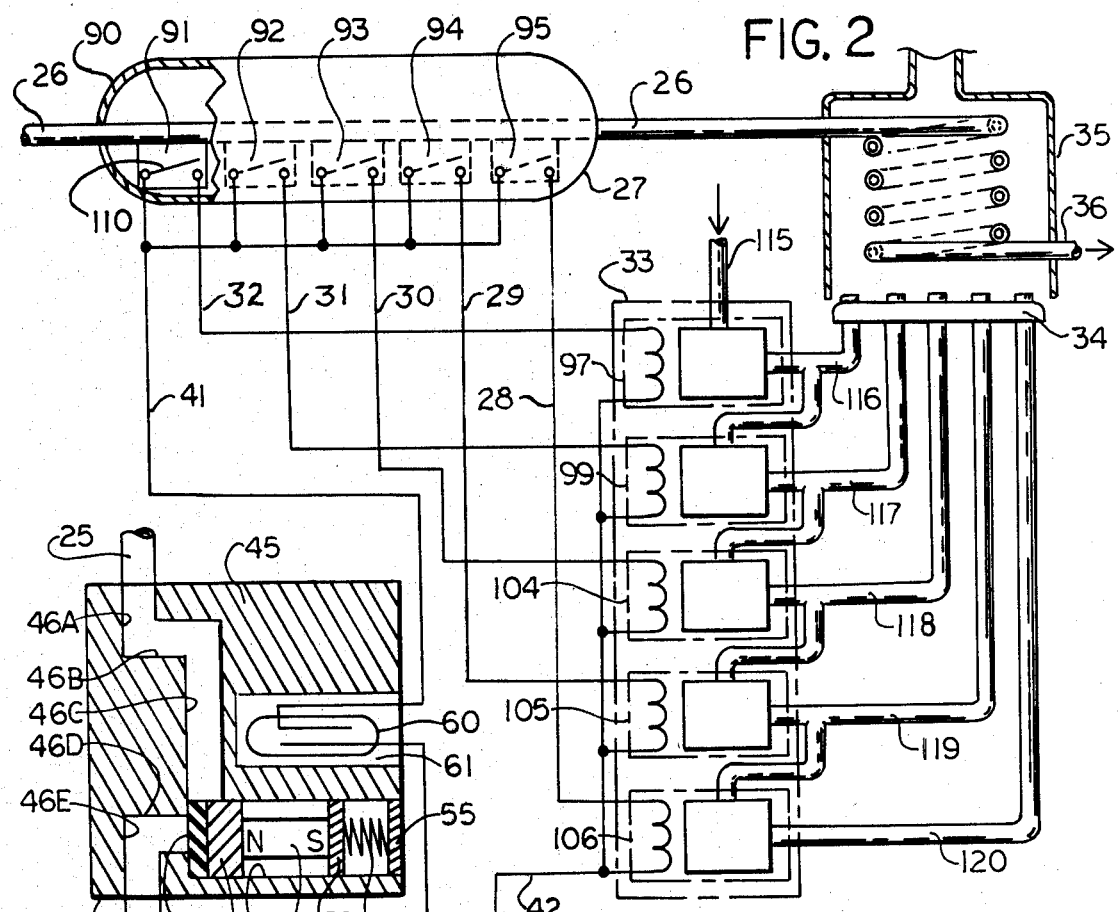
FIG. 2 is a generally diagrammatic showing of the burner control system of the present invention.

The flow transducer 40 (FIG. 2) comprises a housing 45 having a flow passage therein which includes passage sections 46a-46e. An elongate chamber 47 of circular cross-section is provided in the housing in longitudinal alignment with the flow passage section 46d. A magnet 50 is mounted for sliding movement in the chamber 47 by means of two cylindrical guide members 51 and 52, the member 51 being connected to one pole end of the magnet and the member 52 being connected to the other pole of the magnet. A spring 54 is disposed between the guide member 52 and a plug 55, that closes the end of chamber 47, the spring being arranged to urge the magnet away from the plug to a position at which a seal disc 56 is carried by guide member abuts the housing wall around the end of flow passage section 46d. A reed switch 60 is disposed in a second chamber 61 in the housing 45 in a fixed position in which the contact elements of the switch are a distance away from the magnet when the seal disc 56 abuts the housing, as shown in FIG. 2 of the drawings. The switch is arranged so that the relative position of the magnet will cause the contacts to separate and open the electrical circuit that includes conductor 41. It will be noted that in this position the seal disc closes the flow passage in the housing. When the hot water system, of which the heating system of the present invention is a part, is used and water begins to flow, the water will enter the housing 40 in the direction indicated by arrow A, unseat the seal disc against the resistance of the spring 54, and pass through the housing into the system. The pressure of the flowing water moves the magnet to a position at which it is closer to the contact elements of the reed switch, causing the contact to close and connect conductor 41 to a transformer 62 which supplies low voltage current to the control system. The primary of the transformer is connected to the house current supply. Accordingly, when water is flowing in the water system, the burner control circuits are connected to a source of electrical power, but when no water is flowing the burner circuits cannot be energized and the burner 34 cannot be turned on.

Figure 3:
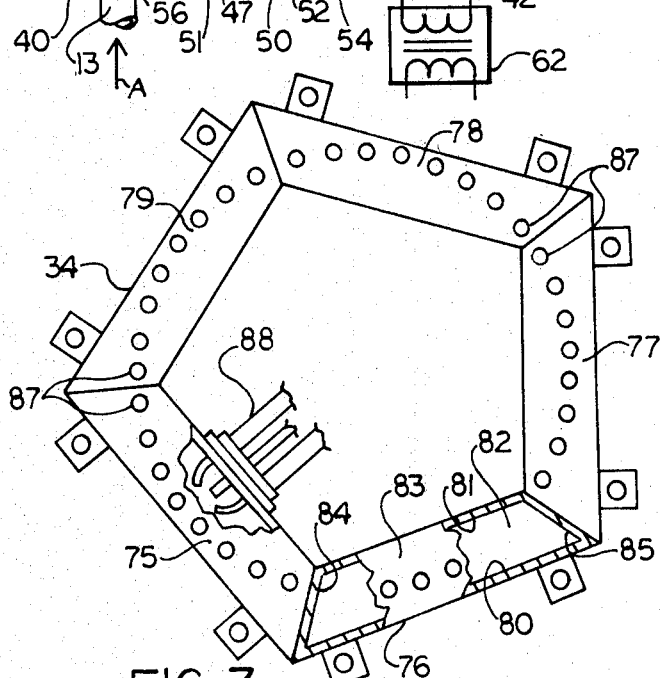
FIG. 3 is a diagrammatic plan view of the burner of the present invention.
Figure 4:
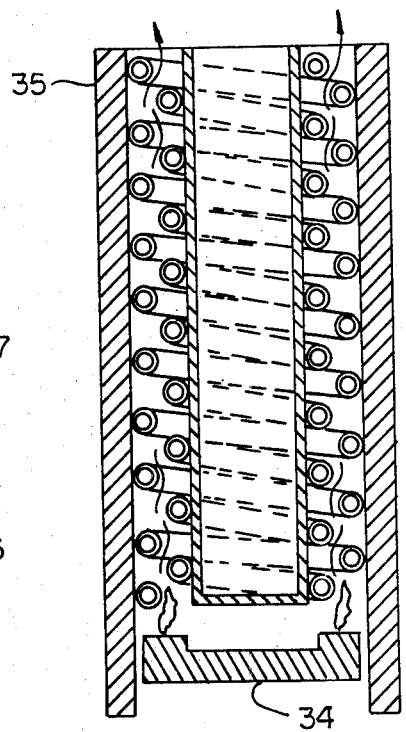
FIG. 4 is a section through a heat exchanger used in the present invention.

The gas burner 34 (FIG. 3) is pentagonal in plan and comprises five separate sections 75-79, each section being shown as generally square in cross-section for convenience only and including a front wall 80, a rear wall 81, bottom wall 82, top wall 83, and end walls 84 and 85. An opening (not shown) is provided in the bottom wall of each section to receive a gas inlet pipe, and a plurality of exit holes 87 are formed in the upper wall to direct the jets of gas upwardly as they are ignited into the coils of the burner as seen in FIG. 4. A spark igniter 88, which is electrically connected to a high voltage generator (not shown) is mounted near the exit holes 87 of the first burner section 75. No igniters are associated with the other four burner sections since the burner sections 75-79 will be turned on in sequence starting with burner 75, and the flames of one section will ignite the gas jets of the adjacent section.

The temperature transducer 27, which is shown schematically in FIG. 2, comprises a housing 90 through which water conduit 26 passes. Five temperature sensitive switches 91–95 are mounted in the wall of the transducer and, each switch includes a housing that extends through an opening in the conduit 26 in liquid-tight engagement, being secured in the opening in the conduit by soldering or similar means. Inside the housing of each switch is a pair of contacts, one being connected to the conductor 41 and the other leading to a solenoid operated valve. The second contact of switch 91 is connected to the conductor 32 leading to a valve 97, and the second contact of the switch 92 is connected to the conductor 31 leading to a valve 99. Similarly, the second contacts of switches 93, 94 and 95 are respectively connected to the conductors 30, 29 and 28 leading to valves 104, 105 and 106 respectively.

Each of the switches includes a bi-metallic element 110 that is sensitive to the temperatures of the water in the conduit 26, and each of the five bi-metallic elements is set to close at a different temperature. For example, the bi-metallic element of switch 91 will close at approximately 130° F.; that of switch 92, at approximately 110° F.; that of switch 93, at approximately 90° F.; that of switch 94, at approximately 70° F.; and the bi-metallic element of switch 95, at approximately 50° F. Thus, when the bi-metallic element 110 of switch 91 determines that the temperature of the water in conduit 26 has fallen to 130° F., it will close its contact and energize valve 91 to open the valve and permit gas to flow from a gas inlet conduit 115 to a conduit 116 leading to the first burner section 75. Thus, if it is desired that water be delivered by conduit 36 at 140° F. and the water in conduit 26 is 130° F., the bi-metallic element 110 in switch 91 will close to energize and open valve 97, permitting gas to flow through conduit 116 to the first section 75 of the burner. When the jets of gas leaving the outlet ports are ignited by the igniter 88 in the conventional manner, the flames from burner section 75 will heat the water in the coils in the heater 35 enough to bring the temperature of the water up to 140° F.

Similarly, if the temperature of the water in conduit 26 has fallen to 110° F., the bi-metallic element in switch 92 will also close to open valve 99 to permit gas to flow through a conduit 117 to the second burner section 76 where it is ignited. The heat from the two burner sections will raise the temperature of the water to the desired 140° F.

Similarly, when the temperature of the water in conduit 26 has fallen to 90° F., switch 93 will close to energize valve 104, permitting gas to flow through conduit 118 to the third section 77 of the burner. When burner section 77 is activated, the three burner sections 75, 76 and 77 cooperate to raise the temperature of the water in the coils to the desired 140° F. In the same manner, switch 94 energizes valve 104 to direct gas through conduit 119 to the fourth section 78 of the burner when the water in conduit 26 is 70°, and switch 95 energizes valve 106 to permit gas to flow through conduit 120 to the fifth section 79 of the burner when the water in conduit 26 is 50° F. It will be noted in FIG. 2 that conduits 116–120 are interconnected and therefore interlocked through flow passages in the valves 97, 99, 104, 105 and 106 for safety precaution.

It is evident that solar collector panels using different materials and having different areas of exposure can be used, following conventional solar panel design principles, to attain the desired temperature range in the storage tank. Panels suitable for the present invention are manufactured by Alten Manufacturing Company of Mountain View, Calif. The mixing valve 24 may be of the type marketed by Amtrol Company of Warwick, R.I. as Model No. 421 or any other type that is capable of receiving relatively cold water, in the range of about 34°–70° F. and hot water in the range of 140°–200° F. and mixing the cold water with the hot water to obtain water at a temperature of 140° F. or below, the valve must be capable of passing it through without adding cold water. Temperature transducer 27 may be of the type shown diagrammatically in FIG. 2 or it may be of the type manufactured by Transamerica Delaval of Los Angeles, Calif. as Model GEMS FS-4. The differential controller 19 may be of the type marketed by Thermologic Corporation of Waltham, Mass. as Model 3201-57.

In FIG. 4 the heat exchanger 35 is illustrated as having two sets of coils over which the hot gases pass. With this type of coil arrangement a maximum amount of exposed coil area can be obtained.

While the heat exchanger has been illustrated as having a gas burner, it will be understood that other heating means such as oil or electrical units could be used. From the foregoing description it will be seen that the present invention provides a hot water heating system in which fuel is used only when water is being drawn and only if the temperature of the water in the storage tank has fallen below the set usage temperature. The burner will not cycle on and off during long periods of non-use, since it is under the control of the flow transducer 40. In some installations it may be desirable to mount a heat exchanger in conduit 17 between the solar collector 15 and the storage tank 10 to provide means for supplementing the heating action of the solar collectors.

On the other hand the present system does not require that the heater expends excessive amounts of fuel since a solar heating system is used in advantageous manner to pre-heat the water in the storage tank to a fairly high intermediate temperature range.

I claim as my invention:

1. In a hot water system for heating water to a desired temperature and in which water is heated by the use of solar heating elements and stored in a tank, the improvement which comprises first means including the solar elements for heating water to a first temperature at or below the desired temperature; and auxiliary means including a conduit for drawing water from said tank, control means in said conduit for restricting flow therethrough to water having a temperature equal to or less than said desired temperature, auxiliary heating means associated with said conduit and arranged when energized to heat water in said conduit, said auxiliary heating means including a plurality of separate burner sections, said control unit having means for sensing the temperature of water in said conduit and energizing said burner sections independently to quickly heat the water in said conduit to said desired temperature in accordance with the difference between the desired temperature and the temperature in said conduit.

2. In a solar heating system of the type wherein water is preheated by use of solar heat and stored in a tank for subsequent removal from the tank through a conduit, an improvement for bringing the water to a predetermined temperature comprising a first control unit for restricting flow of water in said conduit to water having a temperature equal to or less than the desired temperature, and a second control unit having sensing means in said conduit downstream from said first control unit, heating means associated with said conduit and arranged when energized to heat water in said conduit, the sensing means of said second control unit being arranged to energize said heating means when the temperature of the water in said conduit is below the desired temperature.

3. A system for bringing water to a desired temperature comprising a water storage tank, solar means for preheating water to a first temperature and directing it into said tank, a conduit for removing water at the first temperature from said tank, a source of cooling water at a temperature below the desired temperature, a mixing valve in said conduit and connected to said source of cooling water and arranged to add cooling water to the water in said conduit only if said first temperature is above the desired temperature while permitting water at the desired temperature to pass, auxiliary heating means effective when energized to raise the temperature of the water in said conduit, and a control device operatively connected to said auxiliary heating means and having means for sensing the temperature of the water in said conduit and energizing said auxiliary heating means only if the temperature is below the desired temperature.

* * * * *